(12) United States Patent
Nakai (10) Patent No.: US 11,471,341 B2
(45) Date of Patent: Oct. 18, 2022

(54) WHEELCHAIR-MOUNTING VEHICLE

(71) Applicant: Toyota Jidosha Kabushiki Kaisha, Toyota (JP)

(72) Inventor: Fumiko Nakai, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 162 days.

(21) Appl. No.: 16/898,946

(22) Filed: Jun. 11, 2020

(65) Prior Publication Data

US 2021/0039539 A1 Feb. 11, 2021

(30) Foreign Application Priority Data

Aug. 8, 2019 (JP) .............................. JP2019-146763

(51) Int. Cl.
  *B60P 7/08* (2006.01)
  *A61G 3/08* (2006.01)
  *B60N 3/02* (2006.01)

(52) U.S. Cl.
  CPC ........... *A61G 3/0808* (2013.01); *B60N 3/023* (2013.01)

(58) Field of Classification Search
  CPC . A61G 3/0808; B60P 3/06; B60P 7/08; B60P 7/0807; B60P 7/0892; B60P 7/135
  USPC ...................................... 410/7, 8, 17, 18, 23
  See application file for complete search history.

(56) References Cited

U.S. PATENT DOCUMENTS

| | | | | |
|---|---|---|---|---|
| 5,567,095 A | * | 10/1996 | James ................... | A61G 3/0808 410/7 |
| 6,231,283 B1 | * | 5/2001 | Stowers .................. | B60P 3/075 410/7 |
| 7,717,655 B2 | * | 5/2010 | Cardona .............. | A61G 3/0808 410/7 |
| 2005/0214088 A1 | * | 9/2005 | Acton ................... | A61G 3/0808 410/3 |
| 2015/0164716 A1 | | 6/2015 | Kilduff et al. | |
| 2020/0031309 A1 | * | 1/2020 | Bryant .................... | B60R 22/00 |

FOREIGN PATENT DOCUMENTS

| | | |
|---|---|---|
| EP | 1600326 A1 | 11/2005 |
| JP | H11113966 A | 4/1999 |
| JP | 2000-043718 A | 2/2000 |
| JP | 2004-168115 A | 6/2004 |
| JP | 2005-192740 A | 7/2005 |
| JP | 2014-188162 A | 10/2014 |
| JP | 2015-080658 A | 4/2015 |

* cited by examiner

*Primary Examiner* — Stephen T Gordon
(74) *Attorney, Agent, or Firm* — Dinsmore & Shohl LLP (57) ABSTRACT

The disclosure provides a wheelchair-mounting vehicle including a handrail provided in a support shaft and switched between a used position and a stored position as the support shaft rotates, the used position being a position at which the handrail is arranged in a vicinity of a chest area of an occupant of a wheelchair, and the stored position being a position at which the handrail is arranged along a side wall of a vehicle cabin above the used position in the vehicle upper-lower direction. The support shaft in which the handrail for the occupant of the wheelchair in a forward posture is provided is arranged so as to be inclined upward to a front side in the vehicle front-rear direction in a side view.

5 Claims, 8 Drawing Sheets

FIG. 8A COMPARATIVE EXAMPLE

FIG. 8B COMPARATIVE EXAMPLE ent No. 2019-146763 filed on Aug. 8, 2019, which is
WHEELCHAIR-MOUNTING VEHICLE

CROSS-REFERENCE TO RELATED APPLICATIONS

This application claims priority to Japanese Patent Application No. 2019-146763 filed on Aug. 8, 2019, which is incorporated herein by reference in its entirety including the specification, drawings and abstract.

BACKGROUND

1. Technical Field

The disclosure relates to a wheelchair-mounting vehicle.

2. Description of Related Art

There is a wheelchair-mounting vehicle in which a wheelchair-mounting space is formed as a rear seat is folded, and a wheelchair is mounted on the space so that the vehicle carries the wheelchair. In this kind of vehicle, a structure has been known in which a handrail having a grip portion gripped by an occupant of the wheelchair is provided in the wheelchair-mounting space (for example, see Japanese Unexamined Patent Application Publication No. 2005-192740 (JP 2005-192740 A)). The handrail is configured to be switched between a first state and a second state. In the first state, the grip portion is positioned in a location (on a side of the wheelchair) where the grip portion does not block the wheelchair when the wheelchair is mounted. In the second state, the grip portion is positioned in a location (behind a seatback) where the grip portion is retracted from a side of the rear seat when the rear seat is arranged.

SUMMARY

There are instances where the handrail used by an occupant of a wheelchair is at a stored position so that the handrail stays out of the way when the occupant of the wheelchair rides on the wheelchair-mounting vehicle. At the stored position, the handrail is arranged along an upper part of a side wall that configures a vehicle cabin of the wheelchair-mounting vehicle. This kind of handrail rotates around a support shaft of which the axis direction is the vehicle front-rear direction, and can be switched between the stored position and a used position where the handrail is arranged in the vicinity of the chest area of the occupant of the wheelchair.

Here, a window part and a doorway are provided between pillars of the wheelchair-mounting vehicle, the pillars being separated from each other in the vehicle front-rear direction. Therefore, it is preferred that the handrail rotated to the stored position is arranged along an inner wall surface of the pillar, and that the handrail is arranged so as not to protrude from the inner wall surface of the pillar in the vehicle front-rear direction.

However, since a width of the pillar (a length in the vehicle front-rear direction) is relatively small, the occupant of the wheelchair may not be able to be on board at an appropriate position with respect to the handrail arranged at the stored position. This means that, even when an attempt is made to rotate the handrail arranged at the stored position to the used position, a part of the handrail may contact the occupant, and thus may not be arranged at the used position (cannot be rotated to the used position).

An object of the disclosure is to provide a wheelchair-mounting vehicle that is able to restrain occurrence of a defect that a part of a handrail comes into contact with an occupant of a wheelchair and the handrail cannot be rotated to a used position when the handrail arranged at a stored position is rotated so as to be arranged at the used position.

In order to achieve the above object, a wheelchair-mounting vehicle according to a first aspect of the disclosure includes a handrail provided in a support shaft and switched between a used position and a stored position as the support shaft rotates. At the used position, the handrail is arranged in a vicinity of a chest area of an occupant of a wheelchair. At the stored position, the handrail is arranged along a side wall of a vehicle cabin above the used position in the vehicle upper-lower direction. The handrail is used at least for either the occupant of the wheelchair in a forward posture or the occupant of the wheelchair in a rearward posture with respect to an advancing direction. The support shaft in which the handrail for the occupant of the wheelchair in the forward posture is provided is arranged so as to be inclined upward to a front side in the vehicle front-rear direction in a side view. The support shaft in which the handrail for the occupant of the wheelchair in the rearward posture is provided is arranged so as to be inclined upward to a rear side in the vehicle front-rear direction in the side view.

With the wheelchair-mounting vehicle according to the first aspect, the support shaft in which the handrail for the occupant of the wheelchair in the forward posture with respect to the advancing direction is provided is arranged so as to be inclined upward to the front side in the vehicle front-rear direction in the side view, and the support shaft in which the handrail for the occupant of the wheelchair in the rearward posture with respect to the advancing direction is provided is arranged so as to be inclined upward to the rear side in the vehicle front-rear direction in the side view. Therefore, a distal end portion of the handrail rotates while passing a locus inclined obliquely from the vicinity of the head area towards the vicinity of the chest area of the occupant of the wheelchair in the side view when the handrail rotates from the stored position to the used position. Thus, it is possible to restrain occurrence of a defect that a part of the handrail comes into contact with the occupant of the wheelchair and the handrail cannot be arranged at the used position when the handrail arranged at the stored position is rotated so as to be arranged at the used position.

The "vicinity of the chest area" according to the disclosure means a front side of the chest area of the occupant of the wheelchair seen from the occupant. Also, the "wheelchair-mounting vehicle" according to the disclosure generally represents a vehicle that is able to travel with an occupant of a wheelchair on board with or without payment of fare, and a so-called "Mobility as a Service (MaaS)" vehicle such as an automated driving bus is included in the "wheelchair-mounting vehicle" according to the disclosure.

Further, a wheelchair-mounting vehicle according to a second aspect is the wheelchair-mounting vehicle of the first aspect in which the handrail is formed into a curved shape so that the handrail projects in a direction away from the occupant.

With the wheelchair-mounting vehicle according to the second aspect, the handrail is formed into the curved shape so that the handrail projects in the direction away from the occupant of the wheelchair. Therefore, it is possible to more reliably prevent a part of the handrail from coming into contact with the occupant when the distal end portion of the handrail rotates while passing the locus inclined obliquely from the vicinity of the head area towards the vicinity of the chest area of the occupant of the wheelchair in the side view.

Also, a wheelchair-mounting vehicle according to a third aspect is the wheelchair-mounting vehicle of the first aspect or the second aspect in which the handrail is arranged at the used position as a distal end portion of the handrail rotates over 90 degrees from the stored position in a front view.

With the wheelchair-mounting vehicle according to the third aspect, the distal end portion of the handrail is rotated over 90 degrees from the stored position. Therefore, the handrail is arranged in the used position at which the occupant of the wheelchair is able to grip the handrail easily (an upper position in the vicinity of the chest area and also close to the thigh area). Thus, it is easier for the occupant of the wheelchair to grip the handrail and switch it between the stored position and the used position.

Further, a wheelchair-mounting vehicle according to a fourth aspect is the wheelchair-mounting vehicle described in any one of first aspect to the third aspect in which the handrail is arranged at the stored position as the distal end portion of the handrail rotates over 90 degrees from the used position in the front view.

When the distal end portion of the handrail is rotated only by 90 degrees from the used position, the distal end portion of the handrail at the stored position may protrude inward of the vehicle cabin. However, with the wheelchair-mounting vehicle according to the fourth aspect, since the distal and portion of the handrail is rotated over 90 degrees from the used position, the distal end portion of the handrail at the stored position does not protrude inward of the vehicle cabin (the distal end portion of the handrail is arranged along the side wall). Therefore, when an occupant (for example, a non-handicapped person) other than the occupant of the wheelchair gets on board in an area where the occupant of the wheelchair would ride, and when the occupant of the wheelchair gets on board in the area, the handrail arranged at the stored position does not interfere with the occupants.

A wheelchair-mounting vehicle according to a fifth aspect is the wheelchair-mounting vehicle according to any one of the first aspect to the fourth aspect in which a height of the support shaft from a floor surface of the vehicle cabin is from 700 mm to 800 mm.

With the wheelchair-mounting vehicle according to the fifth aspect, the height of the support shaft from the floor surface of the vehicle cabin is from 700 mm to 800 mm. Here, the height position from 700 mm to 800 mm is almost the same as a height position of the chest area of the occupant seated on the wheelchair. Therefore, in comparison to a case where the height position is lower than 700 mm or higher than 800 mm, the occupant of the wheelchair is able to comfortably grip the handrail and switch it between the stored position and the used position by himself or herself.

As described so far, with the disclosure, it is possible to restrain occurrence of the defect that a part of a handrail comes into contact with an occupant of a wheelchair and the handrail cannot be rotated to a used position when the handrail arranged at a stored position is rotated so as to be arranged at the used position.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An embodiment according to the disclosure is described in detail below with reference to the drawings. For convenience of description, an arrow UP, an arrow FR, and an arrow RH shown in the drawings as necessary represent a vehicle upward direction, a vehicle frontward direction, and a vehicle rightward direction, respectively. Therefore, in the description below, when an upper-lower direction, a front-rear direction, and a right-left direction are stated without any specific description, they represent an upward and downward in the vehicle upper-lower direction, frontward and rearward in the vehicle front-rear direction, and right and left in the vehicle right-left direction (a vehicle width direction), respectively.

Further, a view seen in the vehicle width direction is referred to as a "side view", and a view seen in the vehicle front-rear direction is referred to as a "front view". Further, in the embodiment, an automated driving bus (hereinafter, simply referred to as a "bus") 10 is described as an example of the wheelchair-mounting vehicle. Furthermore, in the description below, a state (a posture) of facing an advancing direction of the bus 10 is referred to as a "forward posture", and a state (a posture) of facing the rear is referred to as a "rearward posture".

Figure 1:
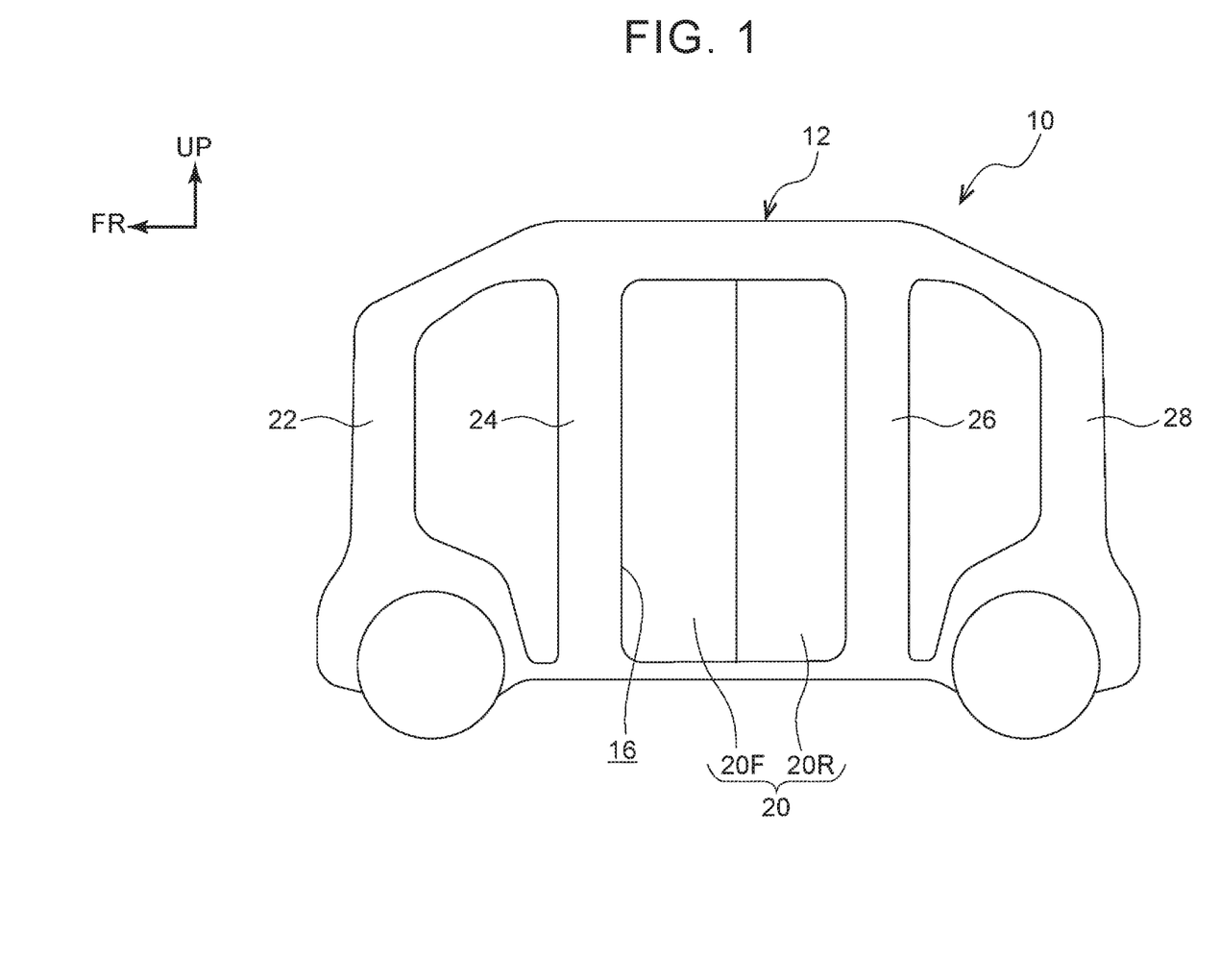
FIG. 1 is a side view of a bus that includes handrails for wheelchairs according to an embodiment.

As shown in FIG. 1, the bus 10 includes a pair of right and left first pillars 22, a pair of right and left fourth pillars 28, a pair of right and left second pillars 24, and a pair of right and left third pillars 26. The right and left first pillars 22 extend in the upper-lower direction in a front portion (a front end portion) of a vehicle body 12. The right and left fourth pillars 28 extend in the upper-lower direction in a rear portion (a rear end portion) of the vehicle body 12. The right and left second pillars 24 extend in the upper-lower direction behind the first pillars 22, respectively, and in front of the third pillars 26 described below, respectively. The right and left third pillars 26 extend in the upper-lower direction in front of the fourth pillars 28, respectively, and behind the second pillars 24, respectively.

Figure 2:
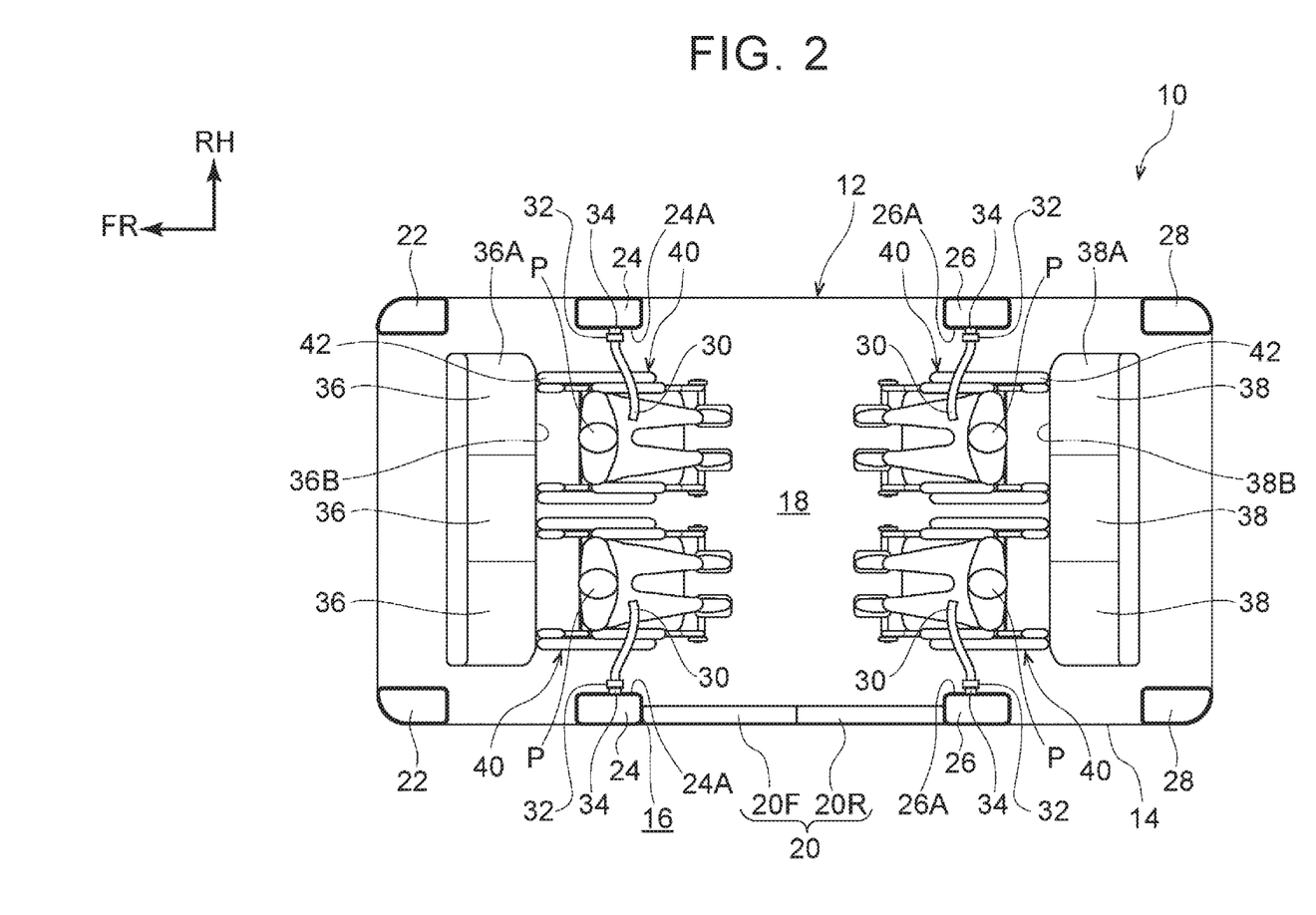
FIG. 2 is a plan view of an interior of the bus and occupants of the wheelchairs, the bus being provided with the handrails for the wheelchairs according to the embodiment.

As shown in FIG. 2, in a plane sectional view, each of the right and left first pillars 22 is formed so as to have an almost rectangular closed sectional shape so that its longitudinal direction is the front-rear direction and an outer part in the vehicle width direction and a front part are formed into an arc shape. Similarly, in the plane sectional view, each of the right and left fourth pillars 28 is formed into an almost rectangular closed sectional shape so that its longitudinal direction is the front-rear direction and an outer part in the vehicle width direction and a rear part are formed into an arc shape. Further, in a plane sectional view, each of the right and left second pillars 24 and each of the right and left third pillars 26 are formed so has to have a rectangular closed sectional shape so that their longitudinal directions are the front-rear direction.

Further, as shown in FIG. 1 and FIG. 2, the bus 10 includes an entrance door 20 that opens and closes a doorway 16 provided in a left side wall 14 of the vehicle body 12 and also between the second pillar 24 and the third pillar 26. The entrance door 20 is configured to be separated in a center portion in the front-rear direction, and a front-side half door 20F and a rear-side half door 20R are able to slide in the frontward direction and the rearward direction, respectively, so that the doorway 16 is open.

Also, as shown in FIG. 2, on a side of a front wall of the vehicle cabin 18, a plurality of (for example, three) front seats 36 is provided in line and integrally with each other in the vehicle width direction. On the front seat 36, an occupant (not shown) other than an occupant P of a wheelchair 40 described later is seated in a half standing posture and also in a rearward posture. Then, on a side of a rear wall of the vehicle cabin 18, a plurality of (for example, three) rear seats 38 is provided in line and integrally with each other in the vehicle width direction. On the rear seat 38, the occupant other than the occupant P of the wheelchair 40 is seated in the half standing posture and also in a forward posture.

The front seats 36 include seat surfaces 36A on which the occupants are seated, respectively, and flat plate-shaped positioning portions 36B extending integrally with each other downwardly from distal end portions of the seat surfaces 36A, respectively. Similarly, the rear seats 38 include seat surfaces 38A on which the occupants are seated, respectively, and flat plate-shaped positioning portions 38B extending integrally with each other downwardly from distal end portions of the seat surfaces 38A, respectively.

Therefore, the occupant P of the wheelchair 40 who is on board in the bus 10 rides in the rearward posture behind the front seat 36 or in the forward posture in front of the rear seat 38. At this time, a part of the wheelchair 40 (for example, a pair of right and left main wheels 42) comes into contact with the positioning portion 36B or the positioning portion 38B. As a result, the wheelchair 40 is arranged in a positioned (fixed) state.

Further, support members 34 are provided at given positions, respectively, on inner wall surfaces 24A of the right and left second pillars 24, and inner wall surfaces 26A of the right and left third pillars 26, respectively. The inner wall surfaces 24A and the inner wall surfaces 26A face inward in the vehicle width direction. The support members 34 support support shafts 32, respectively, so that the support shafts 32 are able to rotate freely, and handrails 30 for the occupants P of the wheelchairs 40 that are on board at the foregoing positions, respectively, are integrally attached to the support shafts 32, respectively.

The handrails 30 that are arranged on the inner wall surfaces 24A of the second pillars 24, respectively, and the handrails 30 arranged on the inner wall surfaces 26A of the third pillars 26, respectively, have the same configuration. Therefore, the handrail 30 arranged on the inner wall surface 26A of the right third pillar 26 is described below as an example. This means that description is given regarding the handrail 30 provided on the right side and in front of the rear seat 38 for the occupant P of the wheelchair 40 on board in the forward posture.

As shown in FIG. 3 to FIG. 7, the handrail 30 is attached integrally on an outer peripheral surface of the columnar support shaft 32, and the support shaft 32 is supported by the support member 34 protruding from the inner wall surface 26A of the third pillar 26 so that the support shaft 32 is able to rotate. Also, the handrail 30 is configured to be switched between a used position and a stored position as the handrail 30 rotates around the support shaft 32 over 90 degrees. At the used position, the handrail 30 is arranged in the vicinity of the chest area of the occupant P of the wheelchair 40. At the stored position, the handrail 30 is arranged along the inner wall surface 26A of the third pillar 26 (a side wall of the vehicle cabin 18) above the used position.

Figure 3:
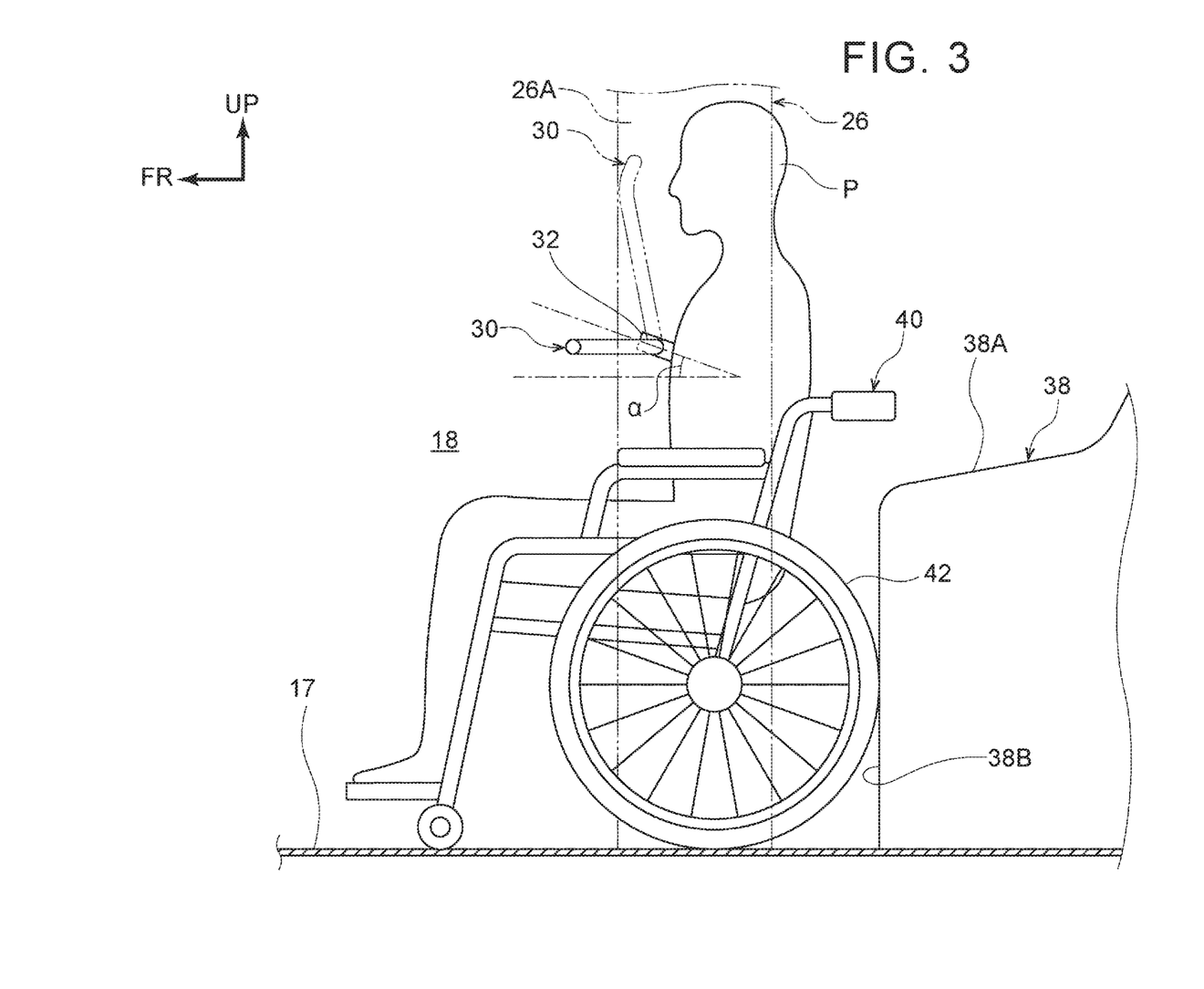
FIG. 3 is a left side view of a state where the handrail for the wheelchair according to the embodiment is arranged at a used position, the view also showing the occupant of the wheelchair.

Also, as shown in FIG. 3, the support shaft 32 is arranged so that its front portion is inclined upward at a given angle $\alpha$ with respect to the horizontal direction (the support shaft 32 is inclined upward toward the front side in the vehicle front-rear direction). The angle $\alpha$ is, for example, $\alpha=5$ degrees to 50 degrees, and is set as appropriate in accordance with the width of the inner wall surface 26A of the third pillar 26 (a length along the front-rear direction). The angle $\alpha$ is set so that the handrail 30 does not protrude in the front- rear direction from the inner wall surface 26A of the third pillar 26 when the handrail 30 is arranged at the stored position.

Figure 4:
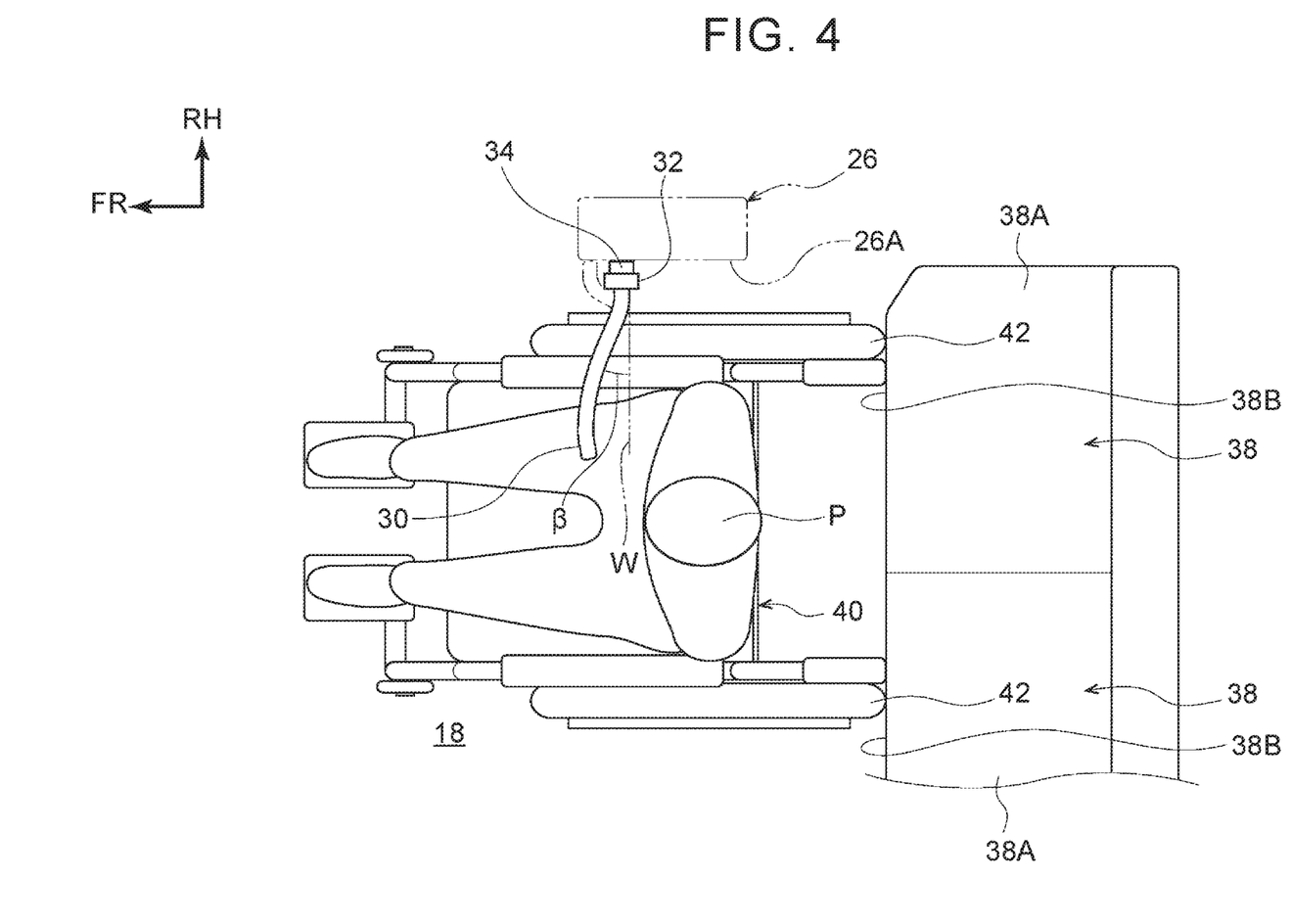
FIG. 4 is a plan view of the state where the handrail for the wheelchair according to the embodiment is arranged at the used position, the view also showing the occupant of the wheelchair.

Further, as shown in FIG. 4, the handrail 30 is formed into a curved shape in a plan view so as to project in a direction away from the occupant P of the wheelchair 40 (in this case, frontward) when the handrail 30 is arranged at the used position. In other words, in the plan view, the handrail 30 arranged at the used position extends inward in the vehicle width direction from the support shaft 32 at an angle $\beta$ (see FIG. 4) of, for example, 30 degrees to 50 degrees, with respect to a virtual line W along the vehicle width direction.

The handrail 30 is gripped by one hand (the right hand in this case). Therefore, in the front view in FIG. 6, the length of the handrail 30 is slightly shorter than a minimum distance from the support shaft 32 to a center position (shown by a virtual line C) of the occupant P of the wheelchair 40 in the right-left direction. Specifically, in FIG. 6 and FIG. 7, a region shown by a virtual line K1 is a movable region of the palm of the right hand (from the wrist through the fingertips) around the right elbow of the occupant P of the wheelchair 40.

Figure 6:
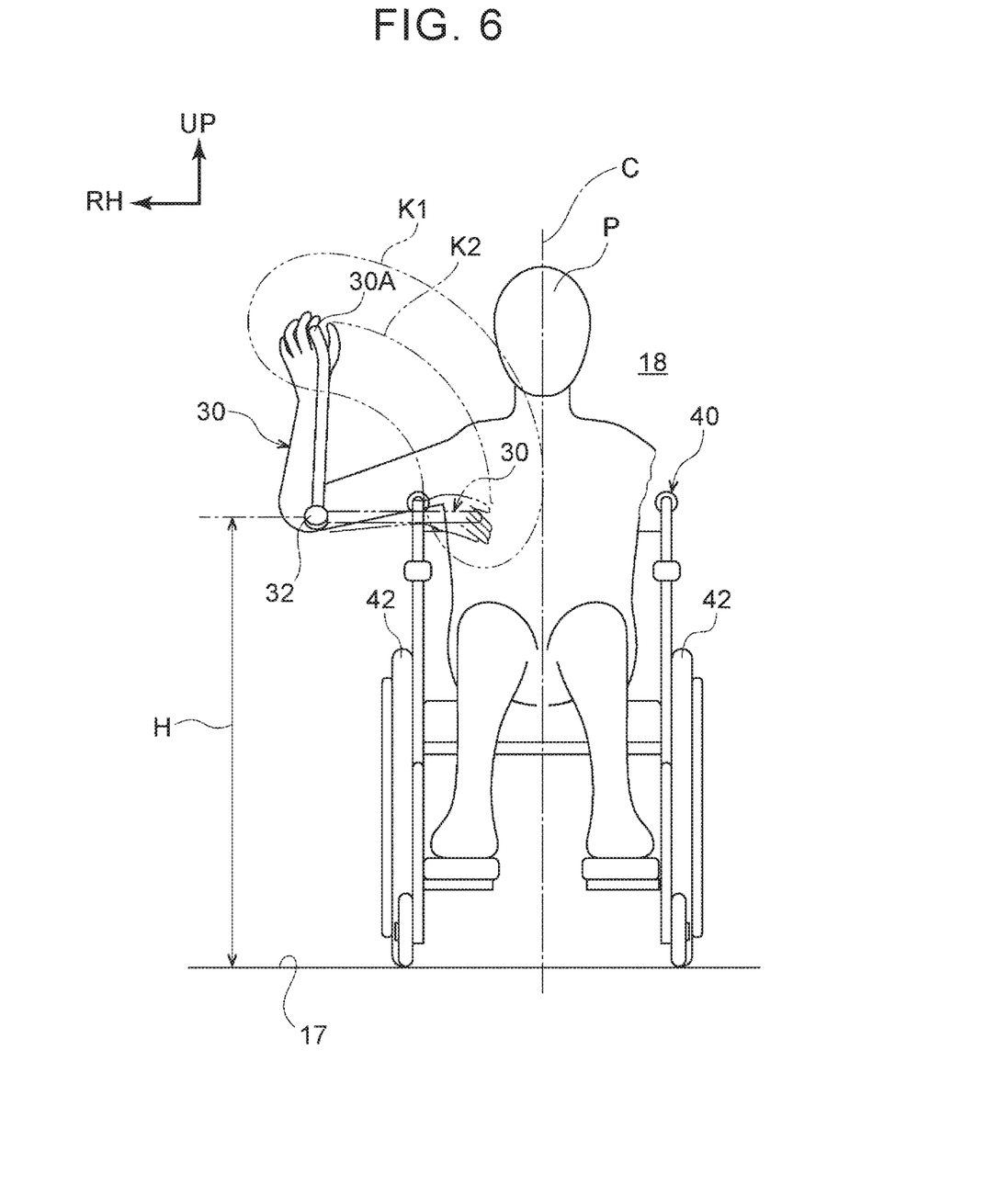
FIG. 6 is a front view of a rotation range of the palm of the hand of the occupant when the occupant grips and rotates the handrail for the wheelchair according to the embodiment.
Figure 7:
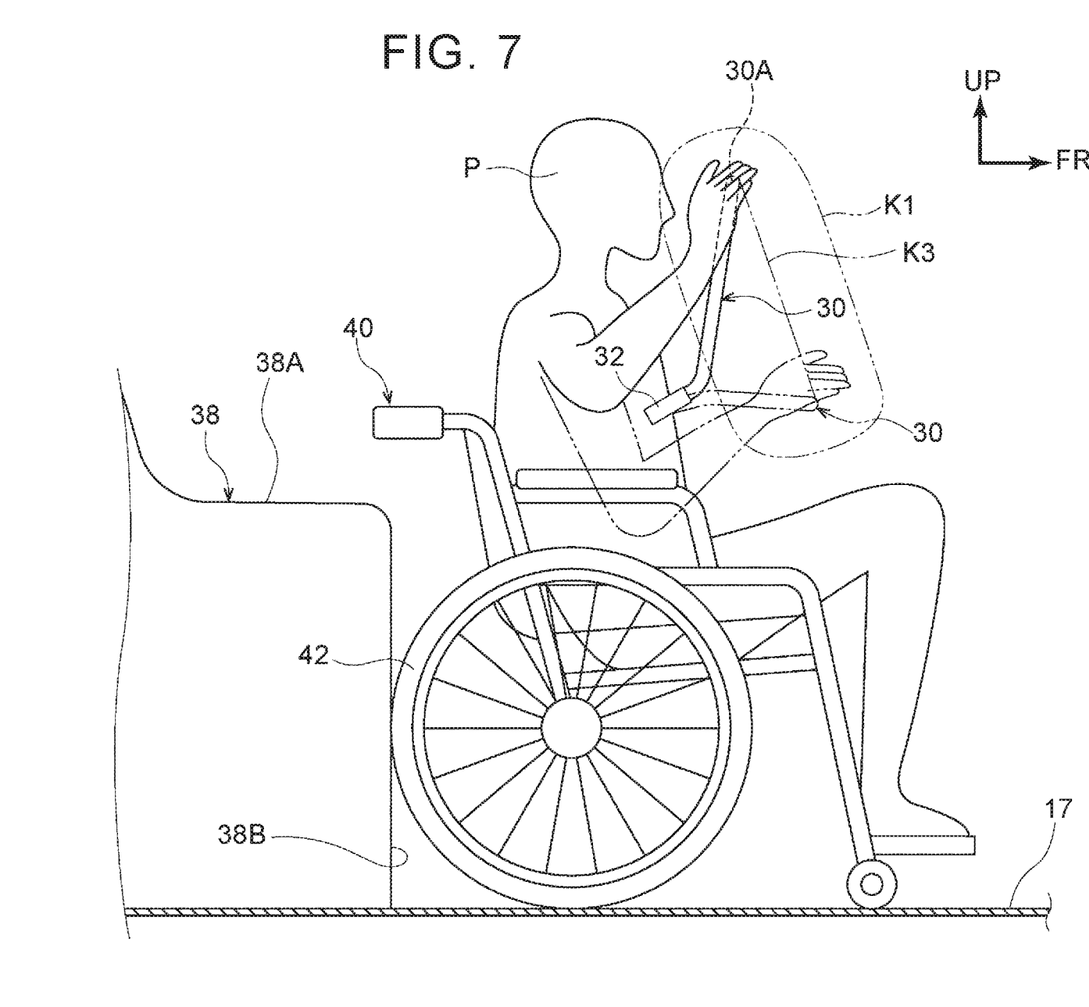
FIG. 7 is a right side view of the rotation range of the palm of the hand of the occupant when the occupant grips and rotates the handrail for the wheelchair according to the embodiment.

Meanwhile, in FIG. 6, a curved line shown by a virtual line K2 is a locus of a distal end portion 30A of the handrail 30. In FIG. 7, a straight line shown by a virtual line K3 is the locus of the distal end portion 30A of the handrail 30. As described above, the length of the handrail 30 is set so that the locus of the distal end portion 30A of the handrail 30 passes almost the center of the movable region of the palm of the right hand around the right elbow of the occupant P of the wheelchair 40.

Figure 5:
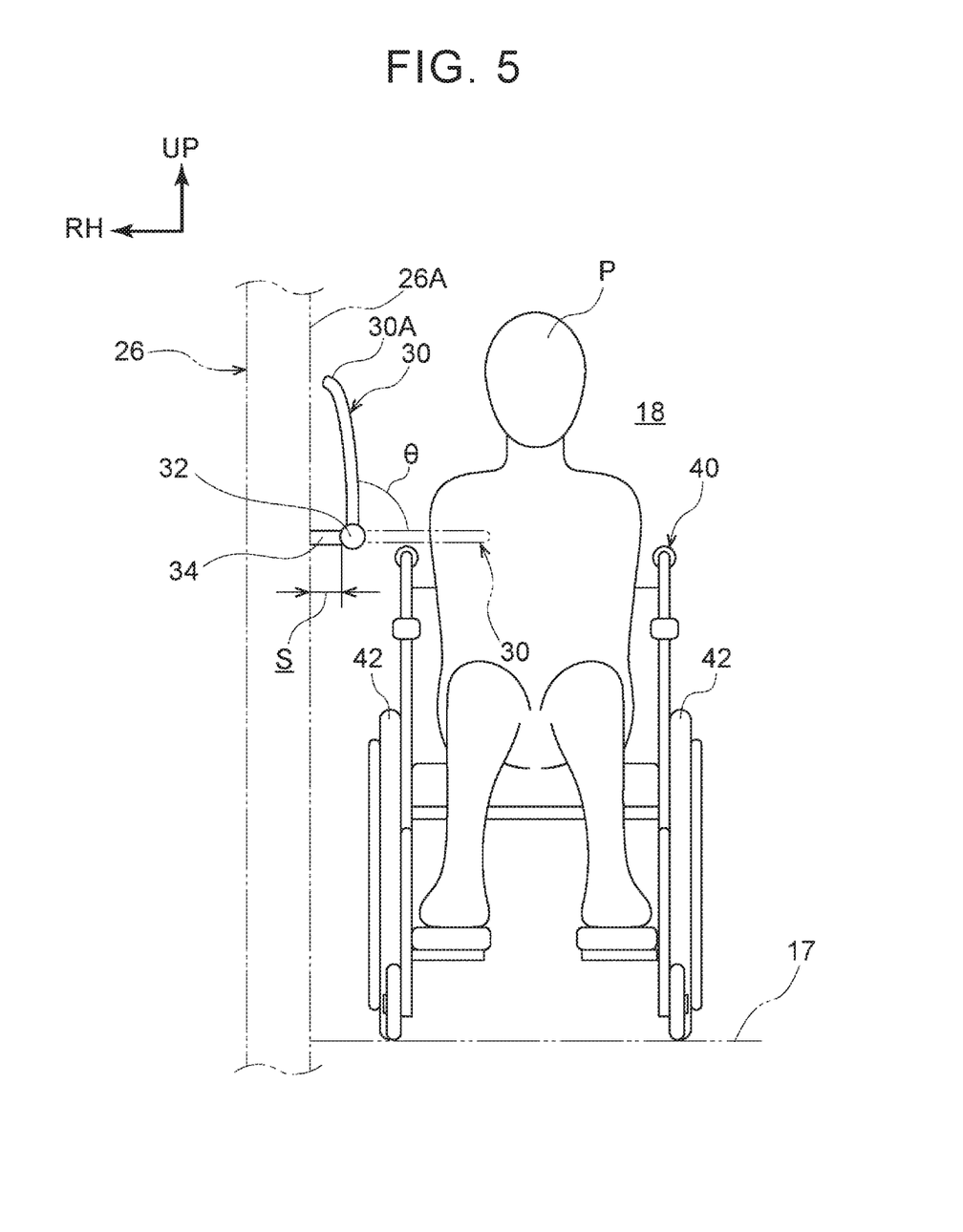
FIG. 5 is a front view of a state where the handrail for the wheelchair according to the embodiment is arranged at a stored position, the view also showing the occupant of the wheelchair.

As shown in FIG. 5 and FIG. 6, in the front view, the distal end portion 30A of the handrail 30 is arranged at the used position as the distal end portion 30A of the handrail 30 rotates over 90 degrees from the stored position. In other words, in the front view, the distal end portion 30A of the handrail 30 is arranged at the stored position as the distal end portion 30A of the handrail 30 rotates over 90 degrees from the used position. More specifically, the rotation angle θ of the handrail 30 is θ=90 degrees+α/2 (θ=90 degrees +2.5 degrees to 25 degrees).

Therefore, there is a space S between the inner wall surface 26A of the third pillar 26 and an outer peripheral surface of the support shaft 32 facing outward in the vehicle width direction so that rotation of the handrail 30 over 90 degrees to the stored position is allowed. In other words, the support member 34 projects inward in the vehicle width direction to an extent that the space S is formed (see FIG. 5).

Furthermore, as shown in FIG. 6, a height H from a floor surface 17 of the vehicle cabin 18 through the shaft center of the support shaft 32 is H=700 mm to 800 mm. More specifically, the height H from the floor surface 17 of the vehicle cabin 18 through the shaft center of the support shaft 32 in the center portion in the axis direction is H=700 mm to 800 mm.

Next, actions of the bus 10 having the configuration described above are described.

Figure 8A:
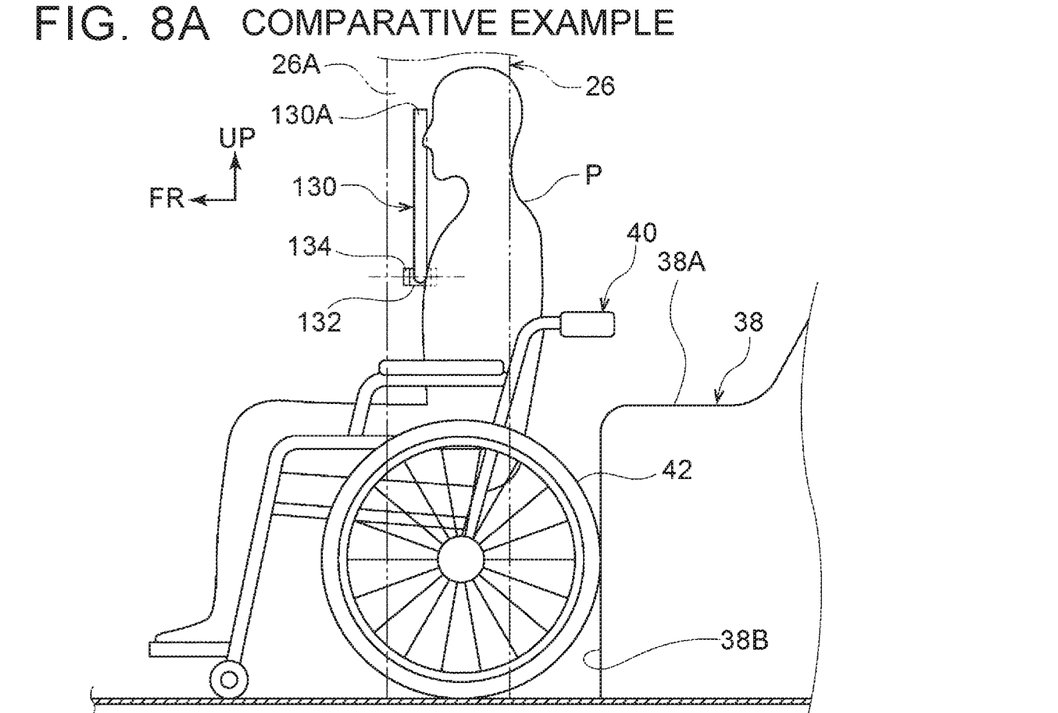
FIG. 8A is a left side view of a state where a handrail for a wheelchair according to a comparative example is arranged at a stored position.
Figure 8B:
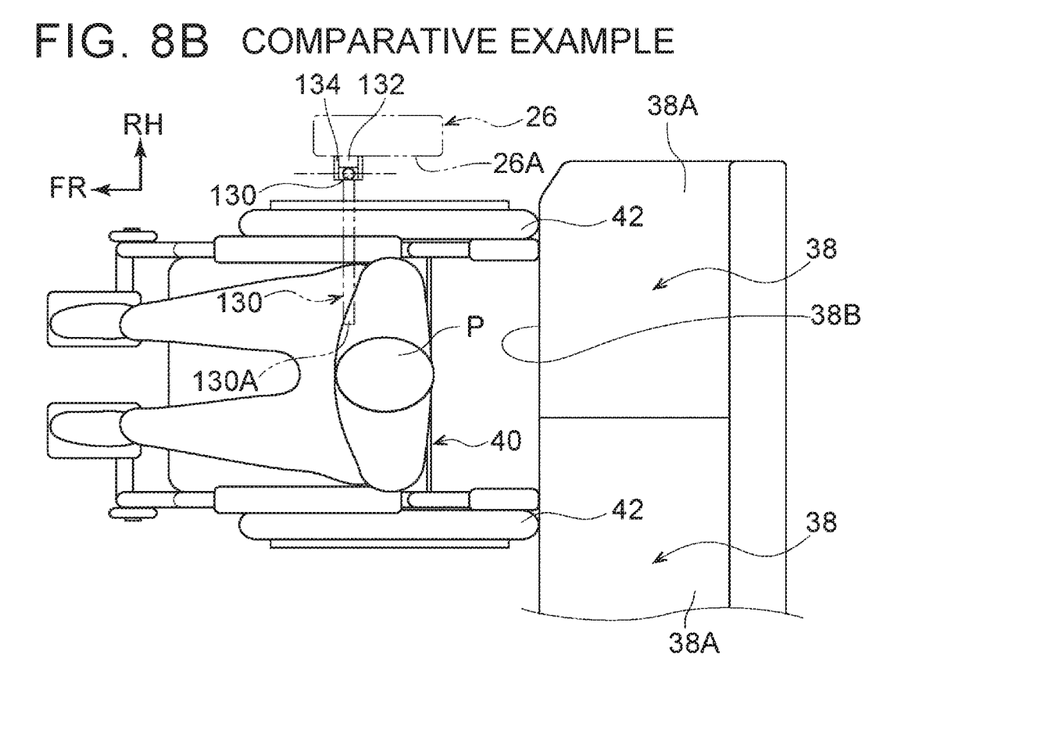
FIG. 8B is a plan view of a state where a part of the handrail for the wheelchair according to the comparative example comes into contact with the shoulder area of the occupant of the wheelchair and cannot be arranged at a used position when the handrail is rotated to the used position.

First of all, a handrail 130 according to a comparative example shown in FIG. 8A and FIG. 8B is described. In this comparative example, the handrail 130 arranged on a side of the inner wall surface 26A of the right third pillar 26 is described as an example. The handrail 130 according to the comparative example is formed into a straight shape instead of the curved shape. Then, a support shaft 132 is arranged along the front-rear direction (the horizontal direction). The support shaft 132 is supported by a support member 134 protruding from the inner wall surface 26A of the third pillar 26 so that the support shaft 132 is able to rotate.

Therefore, as shown in FIG. 8A, in the side view, the handrail 130 does not protrude from the inner wall surface 26A of the third pillar 26 in the front-rear direction when the handrail 130 is arranged at the stored position (when the handrail 130 is arranged along an upper part of the inner wall surface 26A of the third pillar 26).

Here, for example, the occupant P of the wheelchair 40 on board in front of the rear seat 38 on the right side is positioned as the main wheels 42 of the wheelchair 40 come into contact with the positioning portion 38B, and is arranged on the inner side of the inner wall surface 26A of the third pillar 26 in the vehicle width direction. In this state, the handrail 130 arranged at the stored position is rotated to the used position around the support shaft 132.

However, as shown in FIG. 8B, when the handrail 130 is rotated from the stored position, a part of the handrail 130 (for example, a portion near a distal end portion 130A) may come into contact with the vicinity of the shoulder area of the occupant P of the wheelchair 40 positioned as the main wheels 42 contact the positioning portion 38B of the rear seat 38, and it may be impossible to arrange the handrail 130 at the used position in the vicinity of the chest area (the handrail 130 may not be rotated to the used position).

On the other hand, as shown in FIG. 3, the support shaft 32 of the handrail 30 according to the embodiment is arranged so that the front portion of the support shaft 32 is inclined upward at the given angle α with respect to the front-rear direction (the horizontal direction). Therefore, in the side view, the distal end portion 30A of the handrail 30 rotates while passing the locus inclined obliquely from the vicinity of the head area towards the vicinity of the chest area of the occupant P of the wheelchair 40 when the handrail 30 rotates from the stored position to the used position (see FIG. 7).

Therefore, when the handrail 30 arranged at the stored position is rotated and arranged at the used position, it is possible to restrain or prevent occurrence of a defect that a part of the handrail 30 comes into contact with the occupant P of the wheelchair 40 and that the handrail 30 cannot be arranged at the used position.

Moreover, as shown in a plan view in which the handrail 30 is arranged at the used position, the handrail 30 is formed into the curved shape so that the handrail 30 projects in the direction away from the occupant P of the wheelchair 40 (in this case, frontward) (see FIG. 4). Therefore, when the distal end portion 30A of the handrail 30 rotates while passing the locus inclined obliquely from the vicinity of the head area through the vicinity of the chest area of the occupant P of the wheelchair 40 in the side view, it is possible to more reliably prevent a part of the handrail 30 from coming into contact with the occupant P.

Even though the handrail 30 is formed into the curved shape, because the support shaft 32 is inclined at the angle α as described above, it is possible to arrange the handrail 30 rotated to the stored position without the handrail 30 protruding from the inner wall surface 26A of the third pillar 26 in the front-rear direction (in this case, frontward) in the side view (it is possible to arrange the handrail 30 at the desired stored position; see FIG. 3).

Further, in the front view, the handrail 30 is arranged at the used position as the distal end portion 30A of the handrail 30 rotates from the stored position over 90 degrees (see FIG. 5). Therefore, it is possible to arrange the handrail 30 at the used position at which the occupant P of the wheelchair 40 is able to grip the handrail 30 easily (an upper position in the vicinity of the chest area and also close to the thigh area). Further, because of this, it is easier for the occupant P of the wheelchair 40 to grip the handrail 30 and switch it between the stored position and the used position.

Further, in the front view, the handrail 30 is arranged at the stored position as the distal end portion 30A of the handrail 30 is rotated over 90 degrees from the used position (see FIG. 5). Here, if the distal end portion 30A of the handrail 30 can be rotated only by 90 degrees from the used position, the distal end portion 30A of the handrail 30 at the stored position may protrude inward of the vehicle cabin 18 (inward in the vehicle width direction).

However, in the handrail 30 according to the embodiment, since it is possible to rotate the distal end portion 30A of the handrail 30 over 90 degrees from the used position, the distal end portion 30A of the handrail 30 does not protrude inward of the vehicle cabin 18 (inward in the vehicle width direction) at the stored position (the distal end portion 30A of the handrail 30 is arranged along the inner wall surface 26A of the third pillar 26).

Therefore, when an occupant (for example, a non-handicapped person) other than the occupant P of the wheelchair 40 gets on board in an area where the occupant P of the wheelchair 40 would ride, and when the occupant P of the wheelchair 40 gets on board in the area, the handrail 30 arranged at the stored position is out of the way.

Further, the height of the support shaft 32 from the floor surface 17 of the vehicle cabin 18 is set to be 700 mm to 800 mm. Here, the height position from 700 mm to 800 mm is almost the same as a height position of the chest area of the occupant P who is an adult (a male or female adult in a standard size) seated on the wheelchair 40. Therefore, in comparison to a case where the height position is lower than 700 mm or higher than 800 mm, the occupant P of the wheelchair 40 is able to comfortably grip the handrail 30 and switch it between the stored position and the used position by himself or herself.

Moreover, as shown in FIG. 6 and FIG. 7, the length of the handrail 30 is set so that the locus of the distal end portion 30A of the handrail 30 passes almost the center of the movable region of the palm of the right hand around the right elbow of the occupant P of the wheelchair 40. Therefore, the occupant P of the wheelchair 40 is able to grip the handrail 30 and switch it between the stored position and the used position more comfortably.

The operation of switching the handrail 30 between the stored position and the used position is not limited to the manual operation by the occupant P of the wheelchair 40. For example, a torsion spring (not shown) may be installed between the support shaft 32 and the support member 34 so that the handrail 30 returns to the stored position automatically by energizing force of the torsion spring.

This means that, when the handrail 30 is rotated from the stored position to the used position over 90 degrees against the energizing force of the torsion spring, the handrail 30 is held at the used position by a stopper or the like (not shown). When the handrail 30 is rotated slightly upward from the used position, the handrail 30 may be rotated automatically to the stored position by the energizing force of the torsion spring.

The bus (the wheelchair-mounting vehicle) 10 according to the embodiment has been described based on the drawings. However, the bus (the wheelchair-mounting vehicle) 10 according to the embodiment is not limited to the one shown in the drawings, and design changes may be made as necessary without departing from the gist of the disclosure. For example, the shape of the handrail 30 is not limited to the curved shape shown in the drawings, and may be a bent shape and so on.

Further, the bus 10 is not limited to the one that includes both areas where the occupants P of the wheelchairs 40 are on board in the forward posture and the rearward posture, respectively. This means that the bus 10 may be a bus only having an area where the occupants P of the wheelchairs 40 are on board in the forward posture, or a bus only having an area in which the occupants P of the wheelchairs 40 are on board in the rearward posture. This means that the bus 10 is provided with at least either the handrails 30 for the occupants P of the wheelchairs 40 in the forward posture, or the handrails 30 for the occupants P of the wheelchairs 40 in the rearward posture.

Furthermore, in the case of the handrail 30 provided on the side of the inner wall surface 26A of the third pillar 26, since the occupant P of the wheelchair 40 is on board in the forward posture, the support shaft 32 provided with the handrail 30 for the occupant P of the wheelchair 40 is arranged so as to be inclined upwardly to the front side in the vehicle front-rear direction in the side view. However, in the case of the handrail 30 provided on the side of the inner wall surface 24A of the second pillar 24, the occupant P of the wheelchair 40 is on board in the rearward posture. Therefore, the support shaft 32 in which the handrail 30 for the occupant P of the wheelchair 40 is provided is arranged so as to be inclined upwardly to the rear side in the vehicle front-rear direction in the side view.

Further, the front seat 36 and the rear seat 38 may be foldable seats. In this case, a positioning portion with which the main wheels 42 of the wheelchair 40 come into contact only needs to be set as appropriate in the front seat 36 and the rear seat 38 that are folded. Further, the wheelchair 40 may be positioned by the positioning portion 36B of the front seat 36 or the positioning portion 38B of the rear seat 38, and then fixed by a seatbelt device (not shown) or the like provided in the vehicle cabin 18.

What is claimed is:

1. A wheelchair-mounting vehicle, comprising:
a handrail attached to a support shaft and being configured to be switched between a used position and a stored position as the support shaft rotates, the used position being a position at which the handrail is arranged in a vicinity of a chest area of an occupant of a wheelchair, and the stored position being a position at which the handrail is arranged along a side wall of a vehicle cabin above the used position in a vehicle upper-lower direction, wherein:
the handrail is used at least for one of the occupant of the wheelchair in a forward posture and the occupant of the wheelchair in a rearward posture with respect to an advancing direction;
the support shaft which supports the handrail for the occupant of the wheelchair in the forward posture is provided is arranged so as to be inclined upward to a front side in a vehicle front-rear direction in a side view;
the support shaft which supports the handrail for the occupant of the wheelchair in the rearward posture is provided is arranged so as to be inclined upward to a rear side in the vehicle front-rear direction in the side view; and
the handrail has one end attached to the support shaft and an opposite free end.

2. The wheelchair-mounting vehicle according to claim 1, wherein the handrail is formed into a curved shape so that the handrail projects in a direction away from the occupant.

3. The wheelchair-mounting vehicle according to claim 1, wherein the handrail is arranged at the used position as a distal end portion of the handrail rotates over 90 degrees from the stored position in a front view.

4. The wheelchair-mounting vehicle according to claim 1, wherein the handrail is arranged at the stored position as a distal end portion of the handrail rotates over 90 degrees from the used position in a front view.

5. The wheelchair-mounting vehicle according to claim 1, wherein a height of the support shaft from a floor surface of the vehicle cabin is from 700 mm to 800 mm.

* * * * *